United States Patent
Ji et al.

(10) Patent No.: US 7,395,256 B2
(45) Date of Patent: Jul. 1, 2008

(54) METHOD AND PLATFORM FOR TERM EXTRACTION FROM LARGE COLLECTION OF DOCUMENTS

(75) Inventors: Donghong Ji, Singapore (SG); Lingpeng Yang, Singapore (SG); Yu Nie, Singapore (SG)

(73) Assignee: Agency for Science, Technology and Research, Centros (SG)

( * ) Notice: Subject to any disclaimer, the term of this patent is extended or adjusted under 35 U.S.C. 154(b) by 309 days.

(21) Appl. No.: 10/465,567

(22) Filed: Jun. 20, 2003

(65) Prior Publication Data

US 2004/0267709 A1    Dec. 30, 2004

(51) Int. Cl.
*G06F 17/30* (2006.01)
*G06F 7/00* (2006.01)

(52) U.S. Cl. ................ 707/3; 707/5; 707/101
(58) Field of Classification Search ............ None
See application file for complete search history.

(56) References Cited

U.S. PATENT DOCUMENTS

| | | | |
|---|---|---|---|
| 5,287,278 A | 2/1994 | Rau | |
| 5,423,032 A | 6/1995 | Byrd et al. | |
| 5,463,773 A | 10/1995 | Sakakibara et al. | |
| 5,642,518 A | 6/1997 | Kiyama et al. | |
| 5,799,268 A | 8/1998 | Boguraev | |
| 5,926,811 A | 7/1999 | Miller et al. | |
| 6,137,911 A * | 10/2000 | Zhilyaev | 382/225 |
| 6,446,061 B1 | 9/2002 | Doerre et al. | |
| 2004/0117448 A1 * | 6/2004 | Newman et al. | 709/206 |

FOREIGN PATENT DOCUMENTS

EP    1 304 627 A2    4/2003

OTHER PUBLICATIONS

International Preliminary Report on Patentability (PCT Article 36 and Rule 70) May 16, 2005.
T. Strzalkowski, "Natural Language Information Retrieval", *Information Processing and Management*, vol. 31(3), pp. 397-417, 1995.
K. Church et al., "Word Association Norms, Mutual Information and Lexicography", *In proceedings of ACL*, pp. 76-83, 1989.
T. Dunning, "Accurate Methods for the Statistics of Surprise and Coincidence", *Computational Linguistics*, vol. 19(1), pp. 61-74, 1993.

(Continued)

*Primary Examiner*—Apu Mofiz
*Assistant Examiner*—Kavita Padmanabhan
(74) *Attorney, Agent, or Firm*—Sughrue Mion, PLLC

(57) ABSTRACT

A method and platform for statistically extracting terms from large sets of documents is described. An importance vector is determined for each document in the set of documents based on importance values for words in each document. A binary document classification tree is formed by clustering the documents into clusters of similar documents based on the importance vector for each document. An infrastructure is built for the set of documents by generalizing the binary document classification tree. The document clusters are determined by dividing the generalized tree of the infrastructure into two parts and cutting away the upper part. Statistically significant individual key words are extracted from the clusters of similar documents. Key words are treated as seeds and terms are extracted by starting from the seeds and extending to their left or right contexts.

22 Claims, 4 Drawing Sheets

OTHER PUBLICATIONS

L.F. Chien et al., "Internet-based Chinese Text Corpus Classification and Domain-Specific Keyterm Extraction", *Proceedings of Workshop on Computational Technology*, pp. 71-75, 1998.

H. Schutze, "The Hypertext Concordance: A Better Back-of-the-Book Index", *Proceedings of Workshop on Computational Technology*, pp. 101-104, 1998.

C. Jacquemin, "FASTR: A Unification-Based Front End to Automatic Indexing", *Proceedings of RIAO*, pp. 34-47, 1994.

D. Bourigaut, "An Endogeneous Corpus-Based Method for Structural Noun Phrase Disambiguation", *Proceedings of EACL*, pp. 187-213, 1993.

G. Grefenstette, "Explorations in Automatic Thesaurus Discovery", *Kluwer Academic Press*, 1994, 35 page.

J. Pustejovsky, "Lexical Semantic Techniques for Corpus Analysis", *Association for Computational Linguistics*, vol. 19(2), pp. 331-358, 1993.

K. Frantzi et al., "Automatic recognition of multi-word terms: the C-*value*/NC-*value* method", *Journal of Digital Library*, vol. 3, pp. 115-130, 2000.

* cited by examiner

METHOD AND PLATFORM FOR TERM EXTRACTION FROM LARGE COLLECTION OF DOCUMENTS

FIELD OF THE INVENTION

The present invention relates to information extraction and text mining.

BACKGROUND OF THE INVENTION

Prior-art term extraction methods include structure-based methods and statistically based methods.

In structure-based methods, the terms are extracted from documents based on the structures produced by finite-state automation parsing (e.g., Grefenstette, 1994), full syntactical parsing (e.g., Bourigault, 1993; Jacquemin, 1994; Strzalkowski, 1995) or deep semantic theory & analysis (e.g., Pustejovsky et al., 1993). The difficulties with this method are: i) it renders term extraction dependent on syntactic parsing or semantic analysis, which are generally more difficult problems; and ii) the terms are limited by the selected structures.

In statistically based methods, the terms are extracted statistically from a set of documents (e.g., Frantzi and Ananiadou, 1995; Church and Hanks, 1989; Dunning, 1993). In general, a term may be a word or a word string. In the statistical approach, a term holds two features. One is that it is statistically significant in the documents and the other is that its member words, if having more than one member word, are strongly associated. So, to determine whether a term candidate is a real term, its significance in the documents and the association between its member words must be considered.

As to the significance of a term candidate in the documents, existing methods all generally treat the given documents as a single mixed one, and take the terms extracted from this mixed document as the final result (e.g., Chien et. al., 1998; Schutze, 1998). This type of method implies a stringent requirement that given documents must be similar enough to make all the terms look statistically significant when the documents are all put together. But the given documents may not be very similar, and what is more, very similar documents are not easy to acquire for most domains. If the given documents are not very similar, existing solutions will fail to identify those terms which are only statistically significant in a few of the given documents, but not in the whole document collection.

The deeper reason for this problem is that existing methods don't take into account the infrastructure of the given documents. If the prior-art methods could specify the infrastructure and identify the document clusters from the infrastructure (where document clusters are subsets of the documents whose members are similar in some degree) then even if the given documents are not quite similar, they would not miss the terms hidden in the document clusters.

Thus, prior-art statistical solutions require the documents to be very similar to be effective; if given documents are not very similar, some terms may not be accessible by the statistical solutions.

It would be desirable to have a method in which the given documents need not be very similar. It would further be desirable to obtain a hierarchical classification of the given documents while extracting terms. Also, it would be desirable to be able to access the terms hidden in document clusters within the given document collection.

SUMMARY OF THE INVENTION

As far as the field of application is concerned, the solution of the present invention is suitable for not only very similar documents but also documents that are not very similar.

Methodologically, the solution builds an infrastructure for the given documents, determines document clusters from the infrastructure, and bases term extraction on the document clusters. In order to build the infrastructure, the solution integrates term extraction with hierarchical document clustering to produce a binary classification tree for the documents, and introduces a kind of generalization procedure over the binary tree to get a generalized tree. In order to get document clusters, the solution introduces a cutting procedure to cut across the generalized tree.

Functionally, the solution is able to access the terms hidden in the document clusters within the given document set.

The method of the present invention first builds an infrastructure (a kind of hierarchical structure) for the given documents to identify document clusters, each of which consists of similar documents; then extracts statistically significant individual words from these clusters: and finally takes these words as "seeds" to locate terms using mutual information. In order to specify the infrastructure, the method first makes use of a traditional hierarchical clustering algorithm to build a binary tree for the documents, then introduces a generalization procedure to derive the infrastructure from the binary tree. In order to identify document clusters, the method introduces a kind of cutting procedure to cut the infrastructure into two parts, one being a sub-tree, the other being a forest whose root nodes stand for document clusters.

In general terms, the invention includes a method and platform for statistically extracting terms from large sets of documents. An importance vector is determined for each document in the set of documents based on the importance values of words in each document. A binary document classification tree is formed by clustering the documents based on the importance vectors for documents. An infrastructure is built for the set of documents by generalizing the binary document classification tree. The document clusters are determined by dividing the generalized infrastructure into two parts and cutting the upper part. Statistically significant individual key words are extracted from the clusters of similar documents. Then, terms are extracted using the key words as seeds.

BRIEF DESCRIPTION OF THE FIGURES

The working procedure of the invention is described by the following figures, in which.

DETAILED DESCRIPTION OF THE EMBODIMENTS

Figure 1:
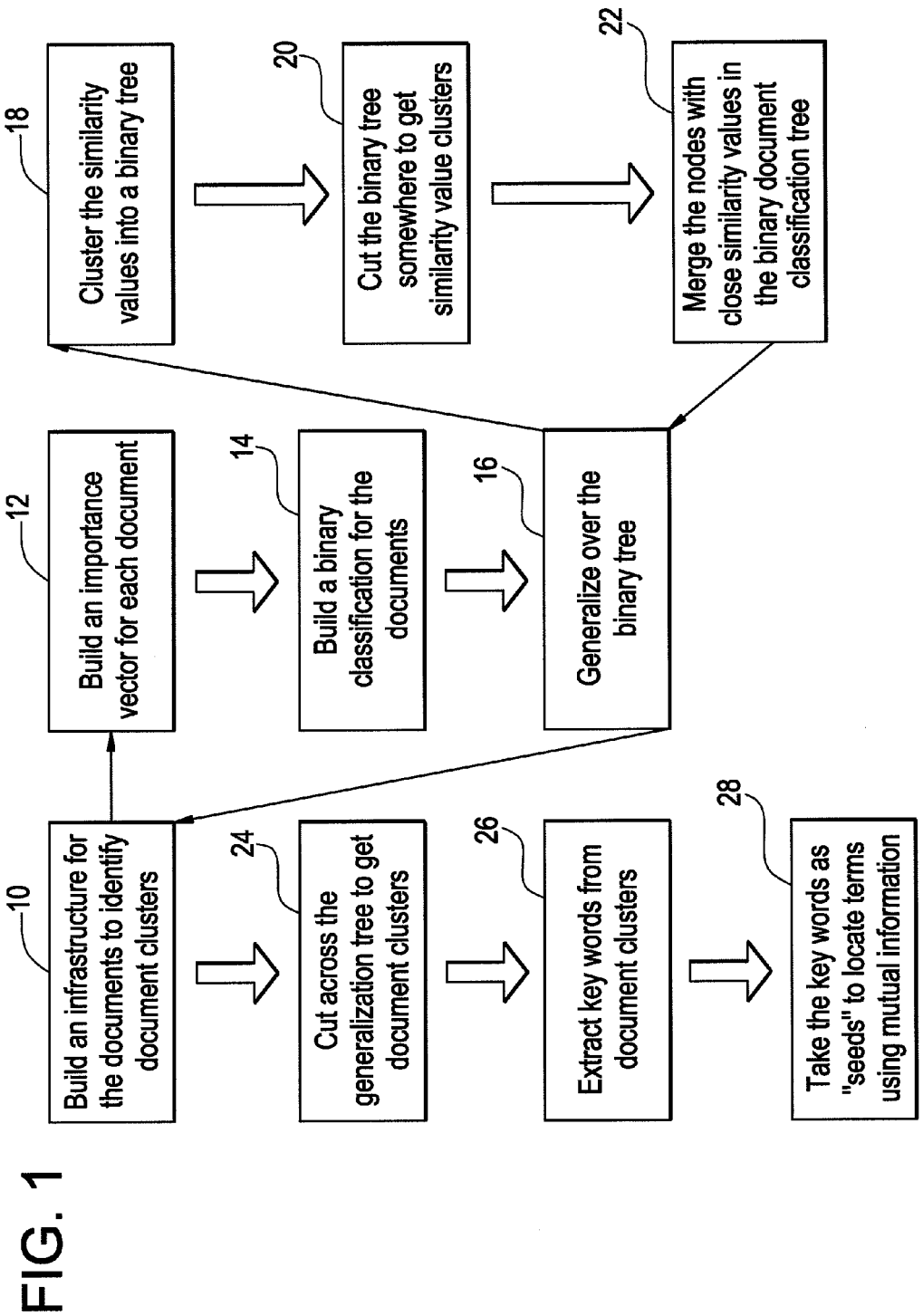
FIG. 1 shows a flowchart of the method of term extraction from a large document collection in the present invention.

FIG. 1 shows a flowchart of the method of term extraction from a large collection of documents in the present invention. In the following equations, a set of documents is designated as "D" and a reference corpus is designated as "R". Here a "reference corpus" is a large and balanced corpus used as a benchmark to determine whether a word in a document is statistically important.

At step 10 an infrastructure is built up for the set of documents to identify document clusters. This step 10 is performed by first building importance vectors for documents in the set of documents at step 12.

First, for each individual document and for each word in the individual documents, the salience and importance of the word in the document is determined with respect to the reference corpus.

Formally, for any document d∈D, and for any word w∈d, the salience of w in d with respect to R, denoted Sal(w, d, R), is:

$$\text{Sal}(w, d, R) = \log(P(w, d)/P(w, R)) \quad (1)$$

where P(w, d) is the probability of w occurring in d, and P(w, R) is the probability of w occurring in R.

The importance of w in d with respect to R, denoted IMP(w, d, R), is:

$$\text{IMP}(w, d, R) = P(w, d) \cdot \text{Sal}(w, d, R). \quad (2)$$

Intuitively, a word is important in one document with respect to the reference corpus if and only it is frequent in the document and salient in the document with respect to the reference.

The importance vector for a document is then formed based on the importance value of each word in the document. Formally, suppose W is the set of all the words occurring in any document in D, let $W = \{w_1, w_2, \ldots, w_n\}$, for any d∈D, its importance vector, denoted IMP(d), is:

$$<\text{IMP}(w_1, d, R), \text{IMP}(w_2, d, R), \ldots, \text{IMP}(w_n, d, R)>. \quad (3)$$

Figure 2:
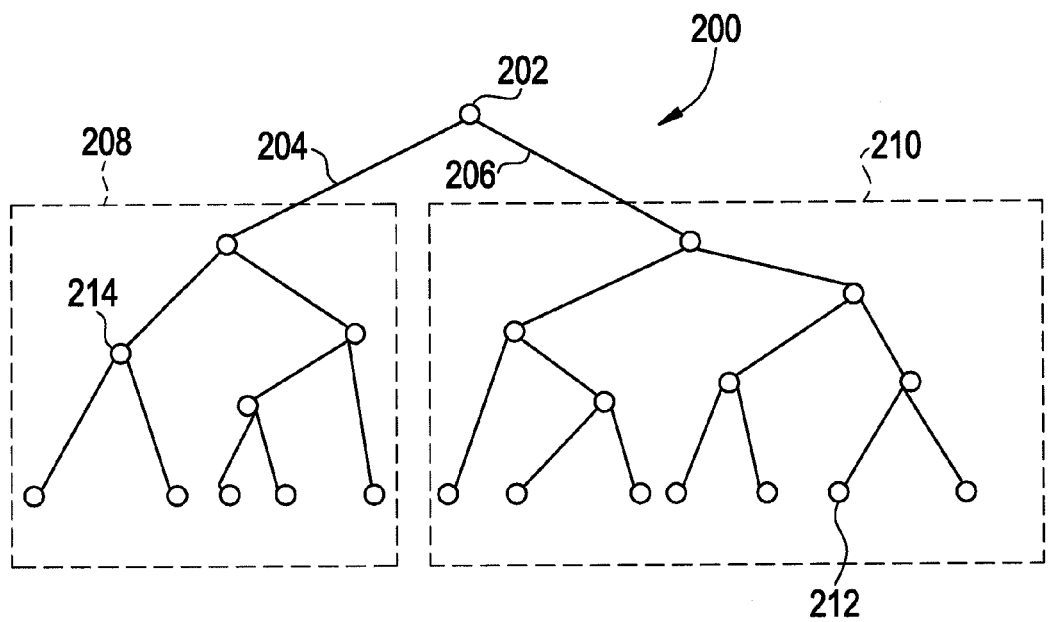
FIG. 2 shows binary hierarchical classification (binary tree) formed for the collection of documents.

After building the importance vector, step 14 is performed to build a binary classification tree for the documents. Using a traditional hierarchical clustering algorithm, the documents are clustered based on their importance vectors determined in step 12 to get the binary hierarchical classification (binary tree) of the documents illustrated in FIG. 2. A binary tree is a tree with two braches at each fork and with one or two tree leaves at the end of each branch. A binary tree 200 is shown having a root node 202 with edges 204, 206 extending to left and right subtrees 208 and 210, respectively. The subtrees are also known as the children of the root node. At the bottom of the tree 200 are tree leaves 212. In FIG. 2, each of the tree leaves 212 can represent one of the documents "d" from the set of documents "D".

The steps for forming the binary tree include: selecting two documents which hold the biggest similarity among all the documents; merging them into a new document replacing the former two (e.g., a node 214 can represent the merged document); computing the importance vector for the new document based on those of the former two; and repeating this procedure until there is only one document which is a combination of the set of documents "D" (represented by the root node 202).

Formally, suppose d1 and d2 are two documents in D, their similarity sim(d1, d2) is defined as the cosine of their importance vectors as equation (4). When the two documents d1 and d2 are merged, the resulting new document can be referred to as document "d". The similarity of d1 and d2 is also called the weight of the document d, denoted weight(d).

$$\text{sim}(d_1, d_2) = \cos(\text{IMP}(d_1), \text{IMP}(d_2)). \quad (4)$$

Next in order to build the infrastructure of step 10, a step 16 is performed in which a generalization of the binary tree 200 is performed. Steps 18, 20 and 22 are performed to achieve step 16. This generalization is useful because in the traditional hierarchical clustering algorithm only two documents are merged in each step and the nodes in a local area in the resulting binary tree tend to take very close weights, which means that the documents, even within different nodes can be very similar. This generalization step merges these similar nodes together.

Figure 3:
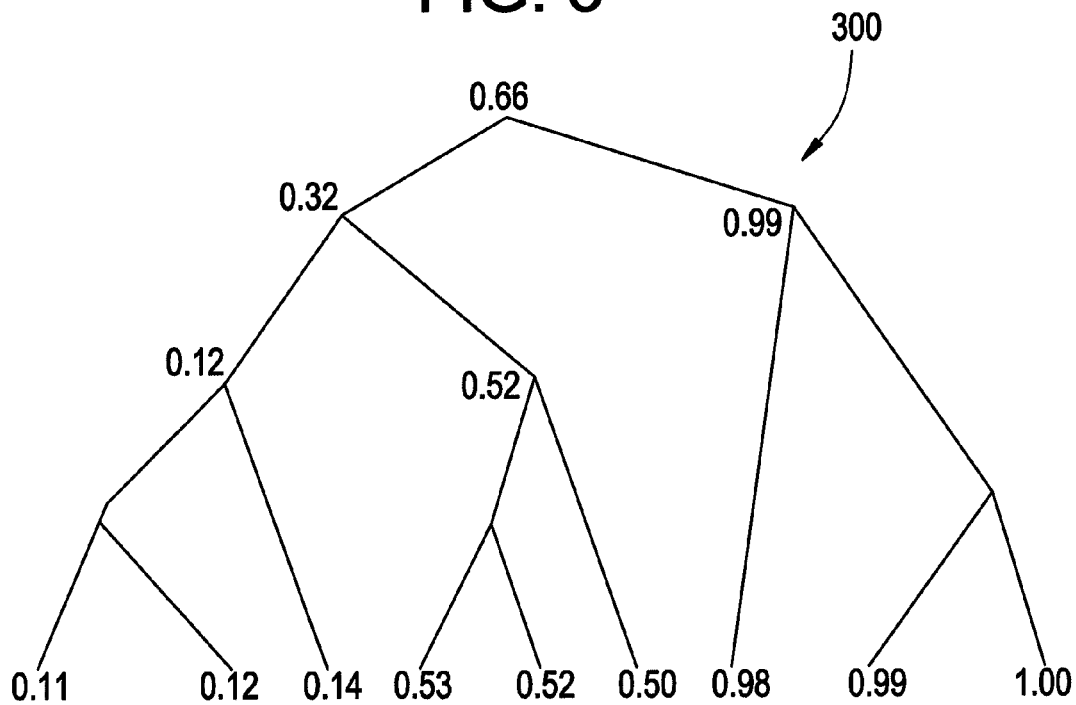
FIG. 3 illustrates a binary weight classification tree used in the method of FIG. 1.

At step 18 a binary weight classification tree (binary similarity classification tree) 300 as illustrated in FIG. 3 is formed by clustering the weights (similarity values) of non-leaf nodes (the nodes other than those such as the tree leaves 212 in FIG. 2) in the binary document classification tree 200. The tree 200 is shown to have 12 leaf nodes 212 and 11 non-leaf nodes 214. Each of the 11 non-leaf nodes has a weight attached to it. So there are 11 weights, each weight being a real number. In this particular example it is assumed that 3 of the 11 weights are the same. Thus there are 9 different real number weights. Each of these weights serves as one of the leaf nodes of the binary tree 300 in FIG. 3 (i.e. the real numbers 0.11, 0.12, 0.14, 0.53, 0.52, 0.50, 0.98, 0.99 and 1.00 at the bottom of the tree 300 in FIG. 3).

Figure 4:
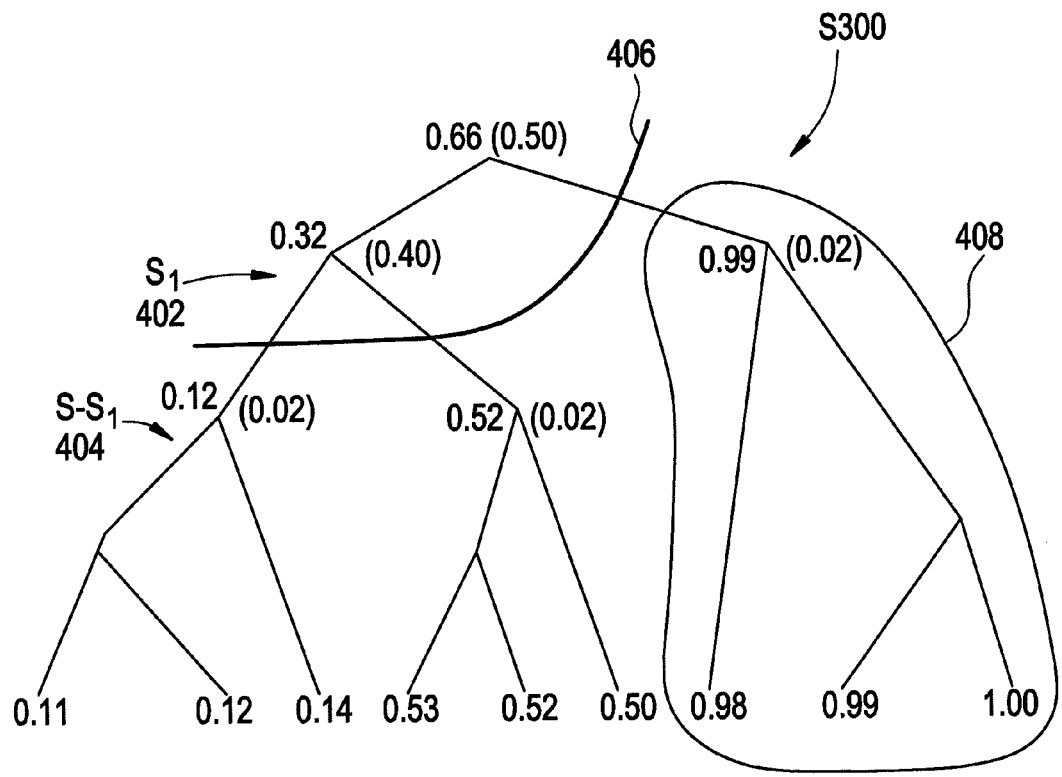
FIG. 4 shows the binary weight classification tree of FIG. 3 cut to determine weight clusters.

The clustering of the weights to form the binary weight classification tree 300 is performed using the same algorithm as was used in step 14 to cluster the documents and form the binary tree 200. In FIG. 3, the weights at the lowest level of the tree are clustered using a traditional clustering algorithm. Their similarity is measured by their difference. For example, if 0.1 and 0.9 are two weights, then their similarity can be measured by their difference, 0.9−0.1=0.8. The real numbers listed in the upper levels of the tree 300 are the weights of the nodes produced from clustering the nodes of the lowest level. FIG. 4 shows scores of the nodes (i.e., the difference between the weights of its sub-nodes) in the tree 300 of FIG. 3 as the real numbers listed in parenthesis. The scores of the nodes in the upper level are generally higher, and those of the nodes in the lower level are generally lower.

Intuitively, step 18 explores the distribution of the weights of the non-leaf nodes in the binary document classification tree 200.

The sub-steps in this weight clustering of step 18 include: i) selecting two weights among all which are the closest; ii) creating a new weight as equal to the average of the two old weights, marking it with their difference as its score, and replacing the two old weights; iii) repeating i) and ii) until there is only one weight.

At step 20, the binary weight classification tree 300 is cut (meaning divided) to determine weight clusters (clusters of the similarity values). In one cluster, the weights are very close. The result is demonstrated in FIG. 4 where the line 406 illustrates the cut in the tree 300. Intuitively, this step is to catch the "gap" existing in the weights of the non-leaf nodes in the binary weight classification tree 300.

Formally, to explain step 20, let S 300 be the binary weight classification tree 300, S1 402 be the sub-tree of S with the same root as S, S−S1 404 be the forest in S with S1 removed, an object function for a cut is defined as the difference between the average score of the nodes in S1 and that of the nodes in S−S1, denoted DEF_SCORE(S1, S−S1):

$$\frac{\sum_{d \text{ in } S_1} score(d)}{|S_1|} - \frac{\sum_{d \text{ in } S-S_1} score(d)}{|S-S_1|} \quad (5)$$

where score(d) is the score of the node d, $|S_1|$ is the number of nodes in $S_1$, and $|S-S_1|$ is the number of the nodes in $S-S_1$. To cut across the tree appropriately means to find $S_1^*$, which satisfies the equation:

$$DEF\_SCORE(S_1^*, S - S_1^*) = \underset{S_1 \text{ in } S}{MAX}(DEF\_SCORE(S_1, S - S_1)). \quad (6)$$

Notice that the number of the sub-tree with the same root as S is exponential to the number of the given documents. However, the binary weight classification tree 300 has the prominent feature that the scores don't decrease as the merging decreases. Thus, the following procedure is used to find $S_1^*$ which satisfies equation (6):

i) Mark the root of S, putting the root in the candidate set, and putting its two children into P, a node set;

ii) Select the marked sub-tree, and extend it by adding one node from P which holds the biggest score in P, as well as its corresponding edge; remove the point from P and adding its non-leaf children into P; putting this sub-tree into the candidate set; marking this sub-tree in S;

iii) Repeat ii) until P is empty;

iv) For each sub-tree in the candidate set, select the sub-tree that maximizes the object function (5) as $S_1^*$.

This procedure is polynomial to the number of the weights. To cut across the binary weight classification tree 300 means to cut $S_1^*$ away from S. The result is a forest, i.e., a set of sub-trees. For each sub-tree, its leaf nodes form a weight cluster such as 408 in FIG. 4.

Next, step 22 of FIG. 1 is performed to merge the nodes of the binary document classification tree 200 in local areas whose weights fall within a weight cluster produced in step 20 (nodes with close similarity values in the binary document classification tree 200). The result is illustrated in FIGS. 5 and 6.

Figure 5:
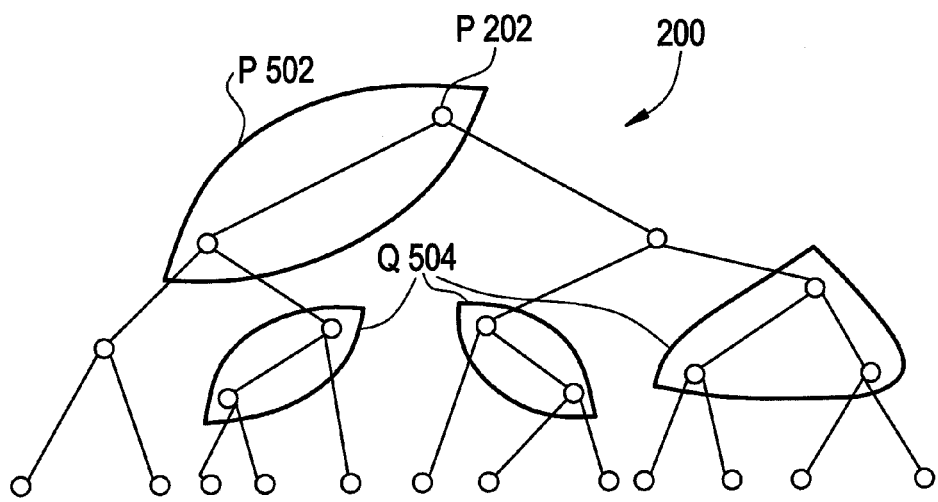
FIG. 5 shows the clustering of nodes to generalize the tree of FIG. 2.
Figure 6:
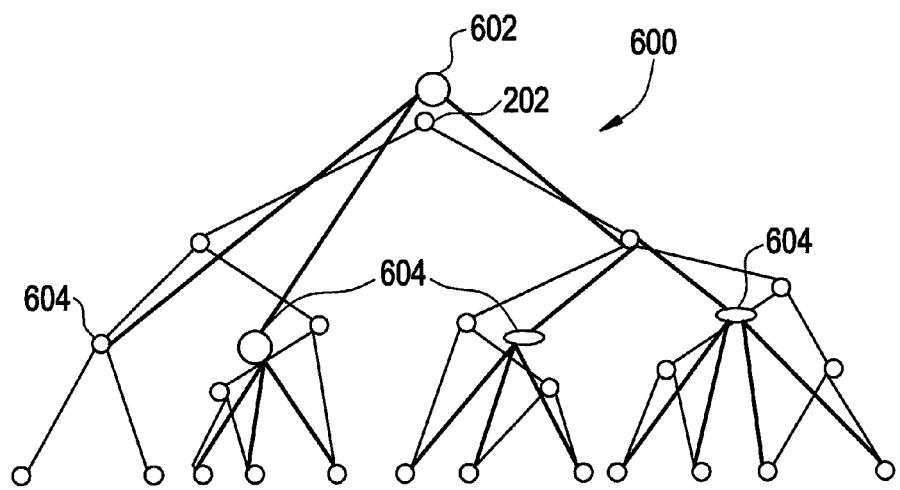
FIG. 6 presents the generalized tree after the nodes of similar documents have been combined.

Suppose p is the root 202 of the binary document classification tree 200. P 502 and Q 504 are all sets of nodes. Step 22 includes the following steps in order to generalize the tree:

i) Put p 202 into P 502 and its child nodes into Q 504, marking the weight cluster in which p's weight falls as a cluster c (for example the cluster 408 in FIG. 4).

ii) While there are nodes in Q whose weights fall in the cluster c, move them into P and move their child nodes (if not leaf nodes) to Q (see FIG. 5);

iii) Merge all nodes in P into one new node 602 and take all nodes in Q as the children 604 of the new node (see FIG. 6);

iv) For all nodes in Q, repeat the procedure.

These steps result in the generalized binary tree 600 of FIG. 6.

Figure 7:
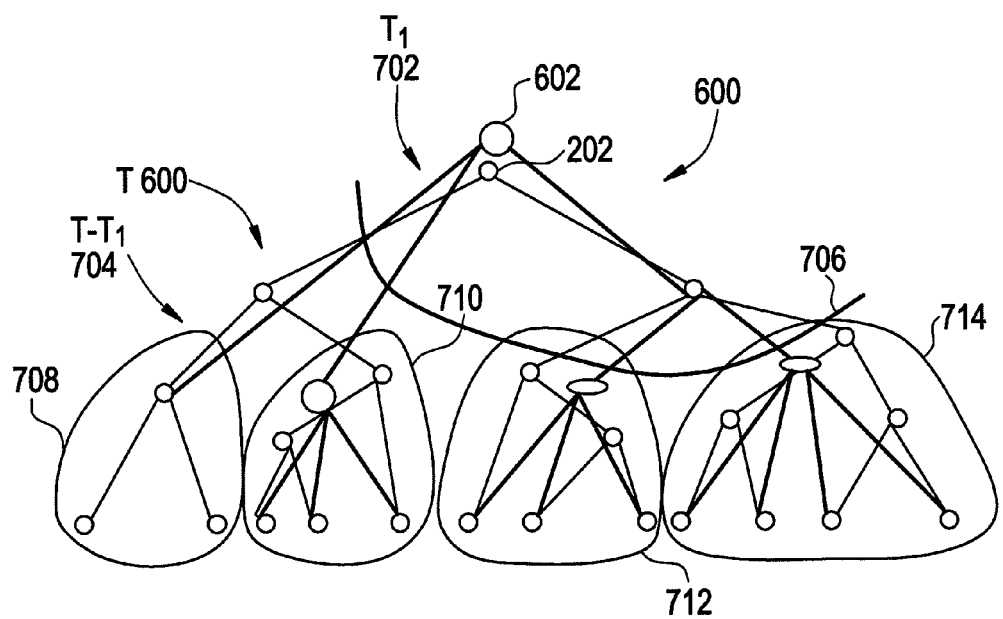
FIG. 7 illustrates a cut through the generalized tree forming two parts, in which the upper part still is a tree with nodes generally having lower weights, the lower part generally have higher weights.

After performing the step 16 for generalizing the binary tree, the infrastructure is complete and a step 24 of FIG. 1 is performed to cut across the generalized tree 600 to get document clusters as illustrated in FIG. 7.

For any node in the generalized tree 600, if it is created by merging some nodes in the binary tree, then the average weight of the nodes in the binary tree are its weight. Generally, an upper level node has a lower weight than lower level nodes, which means that its member documents are less similar, and vice versa.

The tree 600 needs to be cut into two parts, with one part having the same root as the tree and with nodes generally having lower weights. The second part is a forest and the nodes within the second part generally have higher weights. The cut between the two parts is illustrated in FIG. 7 as the line 706. The nodes having a level below the line 706 are the document clusters and individual documents. The nodes having a level in the tree above the line 706 are removed. The procedure for cutting the tree 600 is similar to that described with respect to cutting the binary tree 300 in step 20. Formally, let T 600 be the hierarchical tree, T1 be the sub-tree 702 of T with the same root as T and T-T1 be the forest 704 in T with T1 removed. An object function is defined for a cut as the difference between the average weight of the nodes in T1 and that of the nodes in T-T1, denoted DEF_WEIGHT(T1, T-T1):

$$\frac{\sum_{d \text{ in } T-T_1} weight(d)}{|T-T_1|} - \frac{\sum_{d \text{ in } T_1} weight(d)}{|T_1|} \quad (7)$$

where $|T_1|$ is the number of the nodes in $T_1$, and $|T-T_1|$ is the number of the nodes in $T-T_1$. To cut across the tree appropriately means to find $T_1^*$ which satisfies the equation:

$$DEF\_WEIGHT(T_1^*, T - T_1^*) = \quad (8)$$
$$\underset{T_1 \text{ in } T}{MAX}(DEF\_WEIGHT(T_1, T - T_1))$$

The procedure of locating $T_1^*$ in T is the same as that of locating $S_1^*$ in S as described above. Finally, the forest $T-T_1^*$ 704 is obtained and the nodes in this forest are the document clusters C, for example the four document clusters 708, 710, 712 and 714 in FIG. 7.

Next a step 26 of FIG. 1 is performed to extract the keywords (i.e. statistically significant words) for all individual documents and document clusters based on the importance values of the words. The keywords are treated as "seeds" to locate terms.

If c is a cluster of C (c∈C), the importance vector of c is:

$$<IMP(w_1, c, R), IMP(w_2, c, R), \ldots, IMP(w_n, c, R)> \quad (9)$$

Let W be the set of all the words occurring in any given document, then for any $X \subseteq W$, its average importance, denoted AVE_IMP(X) is:

$$\frac{\sum_{w \in X} IMP(w, c, R)}{|X|} \quad (10)$$

The set of the keywords in c satisfying the following equation are designated as X*:

$$AVE\_IMP(X^*) = \underset{X \subseteq W}{MAX}(AVE\_IMP(X) - AVE\_IMP(W - X)) \quad (11)$$

Intuitively, the importance values for the keywords should be higher, and those for other words should be lower. Thus, the set of the keywords tends to maximize the object function, i.e., maximizes the difference between the average importance value of the keywords and that of the other words.

Step 28 of FIG. 1 is finally performed whereby mutual information is used to determine terms based on the seeds produced in step 26. Here mutual information is a statistical concept in information theory. Intuitively, mutual information between two objects reflects the extent to which one object stands for another. In the present invention, mutual information is used to measure how strongly two words combine together. A word string t is a term if it meets the requirements:

i) it includes at least one seed;
ii) if $t=w_1 t_1 w_2$, $t_1$ is a sub-string of t, then $MI(w_1, t_1 w_2) \geq \partial_1$ or $MI(w_2, w_1 t_1) \geq \partial_1$;
iii) for any $w_1 t w_2$ in c, $MI(w_1, t) < \partial_1$ and $MI(w_2, t) < \partial_1$; and
iv) there is a c in C, $IMP(t, C, R) \geq \partial_2$;

where $MI(x, y)$ is the mutual information between x and y, its definition is $p(x, y)/(p(x) \cdot p(y))$, and $\partial_1$, and $\partial_2$ are two thresholds for mutual information and importance value respectively.

Intuitively, ii) means that the association between inner parts of the term is stronger; iii) means that the association between the term and its adjacent words is weaker; and iv) means that the term is statistically significant in one cluster with respect to the reference corpus.

In general, to locate the terms, we can start from each seed word, extend to the left or the right and check whether ii)~iv) are met until no extension can be made.

The present invention has many applications for information extraction and text mining including domain-specific thesaurus, information retrieval, information summarization, document indexing, document classification, and text understanding.

Although the invention has been described above using particular embodiments, many variations are possible within the scope of the claims, as will be clear to a skilled reader.

We claim:

1. A method for statistically extracting terms from a set of documents comprising the steps of:
   determining for each document in the set of documents an importance vector based on importance values for words in each document;
   forming a binary document classification tree by clustering the documents into clusters of similar documents based on the importance vector for each of the documents;
   building an infrastructure for the set of documents by generalizing the binary document classification tree;
   analyzing distribution of the importance vectors to determine a cutting threshold;
   cutting the generalized tree of the infrastructure according to the cutting threshold to further cluster the documents;
   extracting statistically significant individual key words from the further clusters of similar documents; and
   extracting terms using the key words as seeds, wherein the cutting threshold is defined by $S_1^*$, that satisfies the equation:

$$DEF\_SCORE(S_1^*, S - S_1^*) = \underset{S_1 in S}{MAX}(DEF\_SCORE(S_1, S - S_1))$$

where,
S is the binary document classification tree,
S1 is a sub-tree of S with the same root as S,
S-S1 is a forest in S with S1 removed,
DEF_SCORE(S1, S-S1) is the difference between average score of the nodes in S1 and the nodes in S-S1 and is defined by:

$$\frac{\sum_{d\ in\ S_1} score(d)}{|S_1|} - \frac{\sum_{d\ in\ S-S_1} score(d)}{|S-S_1|}$$

where score(d) is score of the node d,
$|S_1|$ is the number of nodes in $S_1$, and
$|S-S_1|$ is the number of the nodes in $S-S_1$.

2. The method of claim 1, wherein the importance value for words in each document is determined based on the frequency and saliency of the words in the documents with respect to a reference corpus.

3. The method of claim 1, wherein the documents are clustered by performing the steps of:
   selecting two of the documents having the greatest similarity;
   merging the two documents into a new document;
   computing an importance vector for the new document; and
   again selecting and merging two of the documents or new documents having the biggest similarity.

4. The method of claim 3, wherein the similarity of the documents is determined by the cosine of their importance vectors.

5. The method of claim 1, wherein the generalizing step merges similar nodes together.

6. The method of claim 1, wherein the generalizing step includes the steps of:
   clustering similarity values of the documents into nodes forming a binary weight classification tree;
   dividing the binary weight classification tree to determine clusters of nodes forming the binary weight classification tree; and
   merging nodes of the binary document classification tree having similarity values within the clusters of nodes forming the binary weight classification tree.

7. The method of claim 6, wherein the dividing step includes the steps of:
   analyzing the distribution of similarity values to determine a cutting level; and dividing the binary weight classification tree in accordance with the cutting level.

8. The method of claim 1, wherein the step of cutting the generalized binary tree is performed by dividing the tree into one part having the same root as the generalized binary tree and another part having a forest of document clusters of the similar documents of the generalized tree.

9. The method of claim 8, wherein words in X*, which satisfies the equation:

$$AVE\_IMP(X^*) = \underset{X \subseteq W}{MAX}(AVE\_IMP(X) - AVE\_IMP(W - X))$$

are selected as the key words, where
AVE_IMP(X) is the averaged importance value of words in c, defined by $$\frac{\sum_{w \in X} IMP(w, c, R)}{|X|}$$

where c is a cluster of documents,
w is a word in a document in c,
R is a reference corpus, and
X is a candidate keyword set, and
W is the set of all words occurring in any document in c.

10. The method of claim 1, wherein mutual information is used to determine terms based on the seeds.

11. The method of claim 10, wherein a word string t is determined to be a term if it meets requirements including having at least one of the seeds.

12. A computing platform for statistically extracting terms from a set of documents comprising:
    means for determining for each document in the set of documents an importance vector based on importance values for words in each document;
    means for forming a binary document classification tree by clustering the documents into clusters of similar documents based on the importance vector for each of the documents;
    means for building an infrastructure for the set of documents by generalizing the binary document classification tree;
    means for analyzing distribution of the importance vectors to determine a cutting threshold;
    means for dividing the generalized tree of the infrastructure into two parts according to the cutting threshold to define further document clusters;
    means for extracting statistically significant individual key words from the further clusters of similar documents; and
    means for extracting terms using the key words as seeds wherein the cutting threshold is defined by $S_1^*$, that satisfies the equation:

$$DEF\_SCORE(S_1^*, S - S_1^*) = \MAX_{S_1 \ in \ S}(DEF\_SCORE(S_1, S - S_1))$$

where
S is the binary document classification tree,
S1 is a sub-tree of S with the same root as S,
S-S1 is a forest in S with S1 removed,
DEF_SCORE(S1, S-S1) is the difference between average score of the nodes in S1 and the nodes in S-S1 and is defined by:

$$\frac{\sum_{d \ in \ S_1} score(d)}{|S_1|} - \frac{\sum_{d \ in \ S-S_1} score(d)}{|S-S_1|}$$

where score(d) is score of the node d,
$|S_1|$ is the number of nodes in $S_1$, and
$|S-S_1|$ is the number of the nodes in $S-S_1$.

13. The platform of claim 12, wherein the importance value for words in each document is determined based on the frequency and saliency of the words in the documents with respect to a reference corpus.

14. The platform of claim 12, wherein the means for clustering the documents includes:
    means for selecting two of the documents having the biggest similarity;
    means for merging the two documents into a new document;
    means for computing an importance vector for the new document; and
    means for again selecting and merging two of the documents or new documents having the biggest similarity.

15. The platform of claim 14, wherein the similarity of the documents is determined by the cosine of their importance vectors.

16. The platform of claim 12, wherein the generalizing means merges similar nodes together.

17. The platform of claim 12, wherein the generalizing means includes:
    means for clustering similarity values of the documents into nodes forming a binary weight classification tree;
    means for dividing the binary weight classification tree to determine clusters of nodes forming the binary weight classification tree; and
    means for merging nodes of the binary document classification tree having similarity values within the clusters of nodes forming the binary weight classification tree.

18. The platform of claim 12, wherein the step of dividing the generalized tree is performed by dividing the tree into one part having the same root as the generalized binary tree and another part having a forest of document clusters of the similar documents of the generalized tree.

19. The method of claim 18, wherein words in X*, which satisfies the equation:

$$AVE\_IMP(X^*) = \MAX_{X \subseteq W}(AVE\_IMP(X) - AVE\_IMP(W - X))$$

are selected as the key words, where
AVE_IMP(X) is the averaged importance value of words in c, defined by $$\frac{\sum_{w \in X} IMP(w, c, R)}{|X|}$$

where c is a cluster of documents,
w is a word in a document in c,
R is a reference corpus, and
X is a candidate keyword set and
W is the set of all words occurring in any document in c.

20. The method of claim 12, wherein mutual information is used to determine terms based on the seeds.

21. The method of claim 20, wherein a word string t is determined to be a term if it meets requirements including having at least one of the seeds.

22. A method for statistically extracting terms from a set of documents comprising the steps of:
    determining for each document in the set of documents an importance vector based on importance values for words in each document;
    forming a binary document classification tree by clustering the documents into clusters of similar documents based on the importance vector for each of the documents;
    building an infrastructure for the set of documents by generalizing the binary document classification tree;

cutting the generalized tree of the infrastructure to further cluster the documents;

extracting statistically significant individual key words from the further clusters of similar documents; and extracting terms using the key words as seeds; wherein the generalizing steps includes the steps of:

clustering similarity values of the documents into nodes forming a binary weight classification tree;

analyzing the distribution of similarity values to determine a cutting level;

dividing the binary weight classification tree in accordance with the cutting level to determine clusters of nodes forming the binary weight classification tree; and merging nodes of the binary document classification tree having similarity values within the clusters of nodes forming the binary weight classification tree, wherein, wherein the cutting level is defined by $S_1^*$ that satisfies the equation:

$$\text{DEF\_SCORE}(S_1^*, S - S_1^*) = \underset{S_1 \text{ in } S}{\text{MAX}}(\text{DEF\_SCORE}(S_1, S - S_1))$$

where

S is the binary document classification tree,

S1 is a sub-tree of S with the same root as S,

S-S1 is a forest in S with S1 removed,

DEF_SCORE(S1, S-S1) is the difference between average score of the nodes in S1 and the nodes in S-S1 and is defined by:

$$\frac{\sum_{d \text{ in } S_1} score(d)}{|S_1|} - \frac{\sum_{d \text{ in } S-S_1} score(d)}{|S - S_1|}$$

where score(d) is score of the node d, $|S_1|$ is the number of nodes in $S_1$, and $|S-S_1|$ is the number of the nodes in $S-S_1$.

* * * * *